US008416987B2

(12) United States Patent
Tsuji

(10) Patent No.: US 8,416,987 B2
(45) Date of Patent: Apr. 9, 2013

(54) SUBJECT TRACKING APPARATUS AND CONTROL METHOD THEREFOR, IMAGE CAPTURING APPARATUS, AND DISPLAY APPARATUS

(75) Inventor: Ryosuke Tsuji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 683 days.

(21) Appl. No.: 12/638,436

(22) Filed: Dec. 15, 2009

(65) Prior Publication Data

US 2010/0166261 A1    Jul. 1, 2010

(30) Foreign Application Priority Data

Dec. 26, 2008 (JP) ................................. 2008-335229

(51) Int. Cl.
*G06K 9/00* (2006.01)
(52) U.S. Cl. ....................................... 382/103; 382/168
(58) Field of Classification Search .................. 382/103, 382/107, 168, 278; 348/169, 208.99, 208.4, 348/208.14
See application file for complete search history.

(56) References Cited

U.S. PATENT DOCUMENTS

| 6,687,386 | B1 | 2/2004 | Ito et al. ........................ 382/103 |
| 7,573,505 | B2 | 8/2009 | Kawaguchi et al. ....... 348/222.1 |
| 2009/0028440 | A1* | 1/2009 | Elangovan et al. ........... 382/216 |

FOREIGN PATENT DOCUMENTS

| JP | 05-006434 A | 1/1993 |
| JP | 2001-060269 A | 3/2001 |
| JP | 2002-251380 A | 9/2002 |
| JP | 2005-318554 A | 11/2005 |

OTHER PUBLICATIONS

Jan-gun Jiang et al. Real-time Algorithm for face tracking based on mean-shift, Application Research of Computers, vol. 25, No. 7, Jul. 2008.
Dec. 12, 2011 Chinese Office Action, (with an English Translation), that issued in Chinese Patent Application No. 200910261278.3.
Oct. 12, 2012 Japanese Office Action, that issued in Japanese Patent Application No. 2008-335229.
Adaptive Window Method with Sizing Vectors for Reliable Correlation-Based Target Tracking, Sung-II Chien., et al. vol. 33, No. 2, Feb. 1, 2000, pp. 237-249, XP-004243840.
Adaptive Window Algorithm with Four-Direction Sizing Factors for Robust Correlation-Based Tracking, Si-Hun Sung, et al., Nov. 3, 1997, pp. 2008-215, XP-010254325.

(Continued)

*Primary Examiner* — Andrew W Johns
(74) *Attorney, Agent, or Firm* — Cowan, Liebowitz & Latman, P.C.

(57) ABSTRACT

A subject tracking apparatus extracts a subject region which is similar to a reference image on the basis of a degree of correlation with the reference image for tracking a predetermined subject from images supplied in a time series manner. Further, the subject tracking apparatus detects the position of the predetermined subject in the subject region on the basis of the distribution of characteristic pixels representing the predetermined subject contained in the subject region, and corrects the subject region so as to reduce a shift in position of the predetermined subject in the subject region. Moreover, the corrected subject region is taken as the result of tracking the predetermined subject, and the reference image is updated with the corrected subject region as the reference image to be used for the next supplied image.

13 Claims, 11 Drawing Sheets

OTHER PUBLICATIONS

Robust and Accurate Object Tracking Under Various Types of Occlusions, IEEE Transactions on Circuits and Systems for Video Technology, IEEE Service Center, Piscataway, NJ, US, vol. 18, No. 2, Jiyan Pan, et al. Feb. 1, 2008, pp. 223-236, XP-011202544.

Object Tracking: A Survey, Alper Yilmaz, et al., ACM Computing Surveys, ACM, New York, NY, US, vol. 38, No. 4, Dec. 1, 2006, pp. 1-45, XP-007902942.

Computer Vision Face Tracking for Use in Perceptual User Interface, Intel Technology Journal, Jan. 1, 1998, pp. 1-15, Gary R. Bradski, XP-055052595.

Robust Detection and Tracking of Human Faces with and Active Camera, Proceedings, IEEE Workshop on Visual Surveillance, Dorin Comaniciu, et al., Jan. 1, 2000, pp. 11-18, XP-002420094.

Kernel-Based Object Tracking, Dorin Comaniciu, Senior Member, et al., IEEE, May 5, 2003, XP-001185032.

The above reference was cited in a Feb. 14, 2013 European Search Report which is enclosed of the counterpart European Patent Application No. 09180285.0

* cited by examiner

SUBJECT TRACKING APPARATUS AND CONTROL METHOD THEREFOR, IMAGE CAPTURING APPARATUS, AND DISPLAY APPARATUS

BACKGROUND OF THE INVENTION

1. Field of the Invention

The present invention relates to a subject tracking apparatus and a control method therefor, an image capturing apparatus, and a display apparatus.

2. Description of the Related Art

Image processing techniques in which a particular subject is detected from images supplied sequentially in a time series manner and the detected subject is then tracked are very useful, and are utilized, for example, for specifying a human face region in dynamic images. These image processing techniques can be used in a number of different fields, such as teleconferences, man-machine interfaces, security, monitoring systems for tracking human faces, and image compression.

Japanese Patent Laid-Open No. 2005-318554 discloses an image capturing apparatus for detecting the position of a face in an image and focusing on the detected face while capturing an image with an optimum exposure for the face. Japanese Patent Laid-Open No. 2001-60269 discloses an object tracking method and an object tracking apparatus in which a particular subject is tracked with the use of a template matching approach. Template matching refers to a technique of registering, as a reference image, a partial image obtained by clipping an image region as a target to be tracked, estimating a region in the image with the highest degree of correlation in terms of shape with the reference image, and tracking a particular subject.

FIG. 10 shows a flowchart of an example of subject tracking with template matching. Furthermore, FIG. 11 shows an example of subject tracking with template matching, which shows an example of tracking a person's face as a subject.

In FIG. 11, reference numeral 1101 denotes an input image in a frame t=0, reference numeral 1102 denotes a subject detection result for the input image in the frame t=0, and reference numeral 1103 denotes a reference image registered for the input image in the frame t=0. Furthermore, reference numeral 1104 denotes an input image in a frame t=1, reference numeral 1105 denotes a matching result for the input image in the frame t=1, and reference numeral 1106 denotes a reference image updated for the input image in the frame t=1. Furthermore, reference numeral 1107 denotes an input image in a frame t=2, reference numeral 1108 denotes a matching result for the input image in the frame t=2, and reference numeral 1109 denotes a reference image updated for the input image in the frame t=2.

As shown in FIGS. 10 and 11, the input image 1101 in a frame t=0 is loaded in an image apparatus (S1001). Next, subject detection processing is applied to the input image 1101 to extract a subject region which meets conditions for a shape as a human face, and the subject detection result 1102 is acquired (S1002).

Then, the image capturing apparatus registers the initial reference image 1103 from the subject detection result 1102 (S1003). Then, the image capturing apparatus loads the input image 1104 in the frame t=1. Then, the image capturing apparatus carries out matching processing for the input image 1104 with respect to the reference image 1103 registered for the input image 1101 in the frame t=0, in which the input image 1104 is subjected to clipping for each region to obtain a correlation value in terms of shape with respect to the reference image 1103 (S1005).

If the matching processing has not been completed for the matching area over the entire region of the input image (S1006: NO), the image capturing apparatus clips another region of the input image 1104 to carry out the matching processing continuously (S1005). If the matching processing has been completed (S1006: YES), the matching result 1105 is acquired in which a region with the highest degree of correlation is taken as the subject region in the frame t=1 (S1007).

Then, the image capturing apparatus updates the reference image 1106 on the basis of the subject region estimated in the matching result 1105 (S1008). Then, the image capturing apparatus loads the input image 1107 in the frame t=2 (S1004). Then, the image capturing apparatus carries out matching processing for the input image 1107 with respect to the reference image 1106 updated for the input image 1104 in the frame t=1 (S1005).

If the matching processing has not been completed for a predetermined matching area (S1006: NO), the image capturing apparatus carries out the matching processing continuously (S1005). If the matching processing has been completed (S1006: YES), the image capturing apparatus acquires the matching result 1108 in which a region with the highest degree of correlation is taken as the subject region in the frame t=2 (S1007).

Then, the image capturing apparatus updates the reference image 1109 on the basis of the subject region estimated in the matching result 1108 (S1008). As described above, the target subject is tracked by correlating continuously input images with the reference image obtained from the matching result in the previous frame.

However, wrong subject tracking may occur in the conventional tracking method, e.g., in a case in which a subject such as a background, which differs from the subject as a target to be tracked, is contained in the reference image for use in the matching processing, or in a case in which the orientation of the subject as a target to be tracked changes.

For example, in a case in which a subject which differs from the subject as a target to be tracked is contained in the reference image, a subject region affected by the differing subject will be obtained by matching processing. Furthermore, in a case in which the orientation of the subject as a target to be tracked changes, a shifted subject region may be obtained due to a change in the appearance of the subject, and is thus more likely to be affected by a differing subject. As a result, a subject region shifted from the subject as a target to be tracked will be extracted by subject tracking, and wrong subject tracking will thus occur. Then, since the shift of the subject region is not corrected, the subject tracking will be continued in the shifted state.

SUMMARY OF THE INVENTION

The present invention has been conceived in light of the problems of the prior art described above. The present invention provides a technique that allows the occurrence of wrong subject tracking to be reduced when a predetermined subject is tracked from images supplied in a time series manner.

According to an aspect of the present invention, there is provided a subject tracking apparatus for tracking a subject in images supplied in a time series manner, the subject tracking apparatus comprising: a reference image registering unit configured to register a reference image for use in tracking the subject; an extraction unit configured to extract, from a supplied image, a subject region which is similar to the reference image on the basis of a degree of correlation between the supplied image and the registered reference image; a position detection unit configured to detect the position of the subject in the subject region on the basis of a distribution of characteristic pixels representing the subject contained in the subject region; and a correction unit configured to correct the subject region so as to reduce a shift in the position of the subject in the subject region, wherein the corrected subject region is taken as a result of tracking the subject in the supplied image, and the reference image registering unit registers the corrected subject region as a reference image to be used for tracking the subject in a next supplied image.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

First Embodiment

Figure 1:
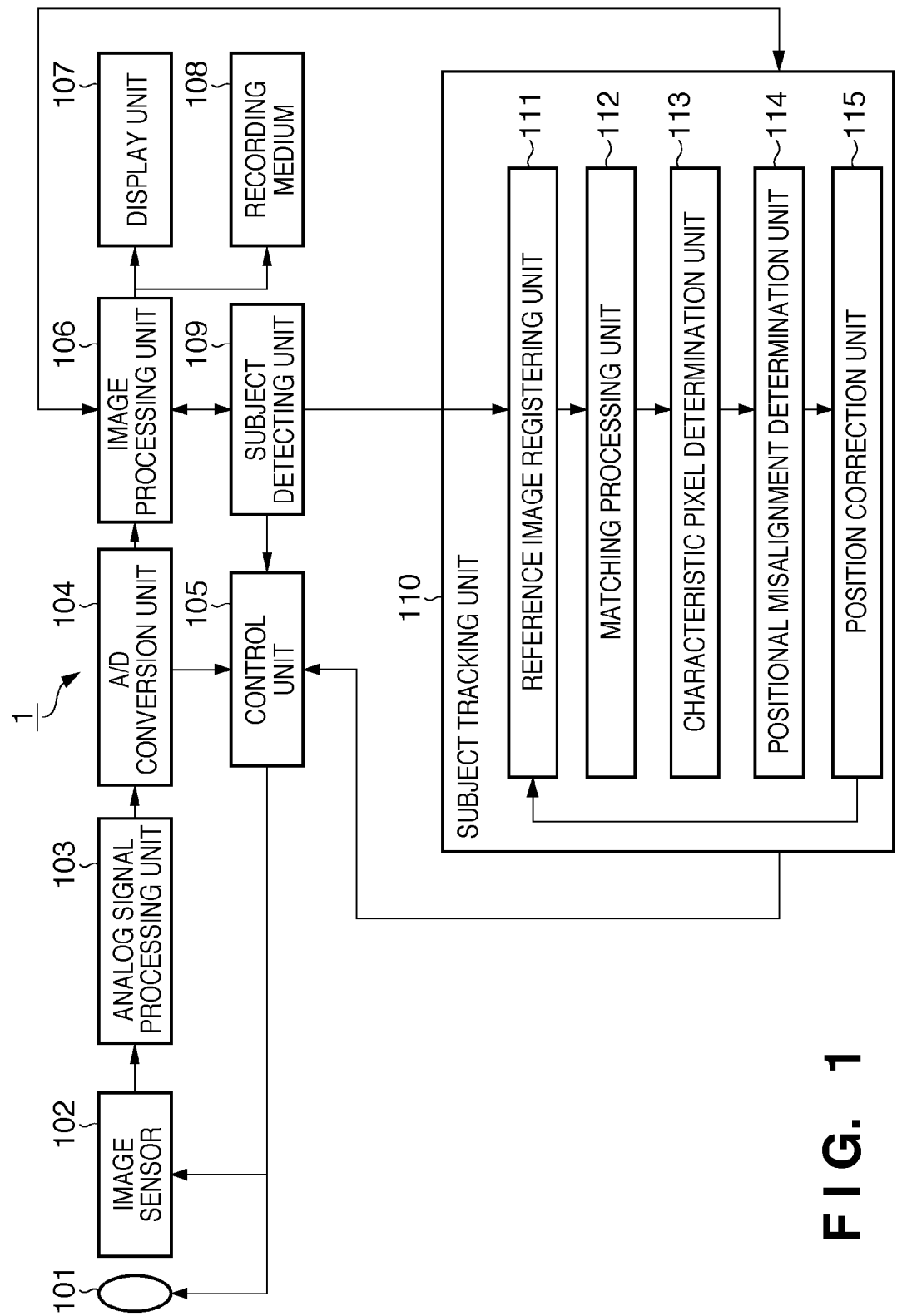
FIG. 1 is a block diagram illustrating the configuration of an image capturing apparatus according to a first embodiment.

The configuration and operation of an image capturing apparatus that is a subject tracking apparatus according to a first embodiment will be described below with reference to the drawings. FIG. 1 is a block diagram illustrating the configuration of an image capturing apparatus 1 according to a first embodiment.

As shown in FIG. 1, in the image capturing apparatus 1, light beams representing a subject image are collected by a photographing lens 101 and enter an image sensor 102 such as a CCD image sensor or a CMOS image sensor. The image sensor 102 outputs electrical signals depending on the strength of the incident light beams, on a pixel by pixel basis. This electrical signal refers to an analog video signal representing the subject image captured by the image sensor 102.

The video signal output from the image sensor 102 is subjected to analog signal processing such as correlated double sampling (CDS) in an analog signal processing unit 103. The video signal output from the analog signal processing unit 103 is converted into a digital data format in an A/D conversion unit 104, and input to a control unit 105 and an image processing unit 106.

The control unit 105 refers to a CPU (Central Processing Unit) or a microcontroller in practice, which exercises central control over the operations of the image capturing apparatus 1. Specifically, the control unit 105 expands program codes stored in a ROM (Read Only Memory) in a work area of a RAM (Random Access Memory) and sequentially executes the expanded program codes, thereby controlling each unit of the image capturing apparatus 1.

In the image processing unit 106, image processing such as gamma correction and white balance processing is applied to the input image signal in the digital format. It is to be noted that the image processing unit 106 also has, in addition to normal image processing, the function of carrying out image processing with the use of information regarding a particular subject region in an image supplied from a subject detecting unit 109 and a subject tracking unit 110 as described below.

The video signal output from the image processing unit 106 is transmitted to a display unit 107. The display unit 107 refers to, for example, an LCD or an organic EL display, which displays the video signal. The image capturing apparatus 1 causes images sequentially captured by the image sensor 102 in a time series manner to be sequentially displayed on the display unit 107, thereby allowing the display unit 107 to function as an electronic viewfinder (EVF).

Furthermore, the video signal output from the image processing unit 106 is recorded on a recording medium 108, for example, a removable memory card. It is to be noted that what the video signal is to be recorded on may be a memory built in the image capturing apparatus 1 or an external device communicably connected via a communication interface (neither of which is shown).

The video signal output from the image processing unit 106 is also supplied to the subject detecting unit 109. The subject detecting unit 109 is designed to detect a predetermined target subject in an image and specify a subject region, and in a case in which the subject is a person, subject regions are specified corresponding to the number of subjects. As for the target subject, a person's face is a typical target subject. In this case, the subject detecting unit 109 specifies a face region of a person as the subject region.

For the method for detecting the subject in the subject detecting unit 109, a known face detecting method is used, for example, in a case in which the target to be detected is a person's face. Known techniques for face detection include a method of utilizing information regarding a face (information on the color of the skin, parts such as eyes, nose, and mouth) and a method of constructing an identifier for face detection with a learning algorithm typified by a neural network. Furthermore, it is common in face detection to carry out face recognition in combination with these methods in order to improve the recognition rate. Specifically, a method can be cited in which the wavelet transformation and the amount of image characteristic as described in Japanese Patent Laid-Open No. 2002-251380 are utilized to carry out face detection. It is to be noted that the detection of subjects other than faces (such as animals and plants or characters) is carried out by identifying characteristic portions of the subjects such as colors or shapes, in a similar way to the face detection described above.

In the subject tracking unit 110, a predetermined subject (subject region) is tracked on the basis of the similarity of the video signal patterns, from the time-varying video signal output from the image processing unit 106. For example, in the subject tracking unit 110, images sequentially captured by the image sensor 102 in a time series manner are arranged in order of time to track similar partial regions, thereby tracking a subject region of a particular pattern. The subject tracking unit 110 is composed of a reference image registering unit 111, a matching processing unit 112, a characteristic pixel determination unit 113, a positional misalignment determination unit 114, and a position correcting unit 115.

In the reference image registering unit 111, a partial region in an image of image signals output from the image processing unit 106 is registered as a reference image, on the basis of the detection result from the subject detecting unit 109 or the tracking result from the subject tracking unit 110. For example, since there is no tracking result from the subject tracking unit 110 at the time of initial operation of the subject tracking unit 110, the reference image registering unit 111 registers, as a reference image, a subject region based on the detection result from the subject detecting unit 109. Subsequent to the initial operation of the subject tracking unit 110, the reference image registering unit 111 is allowed to register as a reference image the result from the subject tracking unit 110.

Furthermore, the reference image registering unit 111 can improve the accuracy of the subject tracking unit 110 by registering a reference image on the basis of a result with a higher degree of reliability in the detection result from the subject detecting unit 109 and the tracking result from the subject tracking unit 110. For example, in a case in which the subject tracking unit 110 tracks a person's face, information regarding the face or the like is utilized to calculate the degree of reliability (first accuracy) as the person's face, in the face region of the person that is the detection result from the subject detecting unit 109. Also, in a tracked face region that is the tracking result from the subject tracking unit 110, the degree of correlation between a subject region extracted by matching processing and a reference image is utilized to calculate the degree of reliability (second accuracy) as the same subject. Then, the reference image registering unit 111 compares the two calculated degrees of reliability, determines that the higher degree of reliability is taken as the higher detection accuracy, and uses the image with the higher accuracy as a reference image to be used for matching processing in connection with the next supplied image. This improves the accuracy of tracking of a person's face by the subject tracking unit 110.

The matching processing unit 112 carries out matching processing for an image of video signals in a current frame acquired by sequential image capturing with respect to a reference image registered in the reference image registering unit 111. Through the matching processing, a region with the highest degree of correlation with respect to the reference image in the image of the video signals in the current frame is extracted as a subject region of the target to be tracked. The matching processing unit 112 is here intended to operate only in a case in which a reference image is registered which is different in terms of time from the video signals in the current frame, that is, in a case in which a reference image is previously registered by the reference image registering unit 111.

The characteristic pixel determination unit 113 determines, as a characteristic pixel, a pixel in a subject region extracted by the matching processing unit 112, in a case in which color information of each pixel is contained in a predetermined color model which represents a characteristic of a predetermined subject targeted for tracking. More specifically, the characteristic pixel determination unit 113 determines, as a characteristic pixel, a pixel of a color contained in a color model which represents a predetermined subject. In the present embodiment, the predetermined color model is provided as a flesh-colored model representing the color of person's skin, because the subject targeted for tracking is a face. It is to be noted that the predetermined color model may be a fixed color model provided in advance in a memory or the like, or may be varied dynamically depending on a subject region detected by the subject detecting unit 109 or a subject region extracted by the matching processing unit 112.

In embodiments described below, the characteristic pixel determination unit 113 determines a characteristic pixel on the basis of color information of each pixel.

On the basis of the result from the characteristic pixel determination unit 113, the positional misalignment determination unit 114 calculates the direction and amount of correction on the basis of the state of distribution of the characteristic pixels in order to correct the position of a subject region extracted by the matching processing unit 112. Specifically, in the subject region extracted by the matching processing unit 112, the positional misalignment determination unit 114 provides an axis of symmetry passing through the center of the region. More specifically, the axis of symmetry is a line which bisects the subject region.

Then, the number of characteristic pixels determined by the characteristic pixel determination unit 113 is counted for the regions partitioned (i.e., sub regions) with the axis of symmetry as a border. Then, the direction and amount of correction are calculated depending on the shift of the characteristic pixels. It is to be noted that the direction of correction is perpendicular to the axis of symmetry, and determined as the direction toward the region with the larger number of characteristic pixels in the two regions partitioned with the axis of symmetry as a border.

Furthermore, the amount of correction is determined as a value corresponding to the difference in the number of characteristic pixels between the two sub regions, so as to reduce the shift in the distribution of the characteristic pixels with the axis of symmetry as a center when the position of the subject region is corrected. For example, the amount of correction is determined as a larger value when the difference is larger, and the amount of correction is determined as a smaller value when the difference is smaller. It is to be noted that the amount of correction may be calculated so as to reduce the shift in the distribution of the characteristic pixels in the subject region, and for example may be a value corresponding to the average of the distances between the axis of symmetry and each of the characteristic pixels.

The position correcting unit 115 corrects the position of the subject region extracted by the matching processing unit 112 in accordance with the amount and direction of correction based on the result from the positional misalignment determination unit 114. In the subject tracking unit 110, the subject region which has the position corrected by the position correcting unit 115 is taken as the result from the subject tracking unit 110. This result from the subject tracking unit 110 is supplied to the control unit 105 and the image processing unit 106.

The control unit 105 controls image capturing conditions such as focus and exposure when capturing images with the image sensor 102. Specifically, the control unit 105 controls a focus control mechanism and an exposure control mechanism (neither of which is shown) of the photographing lens 101 on the basis of video signals output from the A/D conversion unit 104. For example, the focus control mechanism refers to an actuator for driving the photographing lens 101 in the direction of the optical axis, and the exposure control mechanism refers to an actuator for driving an aperture and a shutter.

The control unit 105 is capable of using information on the result of extracting the subject region supplied from the subject detecting unit 109 or the subject tracking unit 110 in order to control the focus control mechanism and the exposure control mechanism. Specifically, the control unit 105 exercises focus control with the use of the contrast value of the subject region and exposure control with the use of the luminance value of the subject region. Thus, the image capturing apparatus 1 is capable of carrying out processing for image capturing taking into consideration a particular subject region in a captured image. Furthermore, the control unit 105 also controls reading from the image sensor 102, such as the output timing and the output pixels of the image sensor 102.

It is to be noted that the image capturing apparatus 1 described in the present embodiment is one which includes the subject detecting unit 109 for detecting a subject region from images sequentially captured in a time series manner and the subject tracking unit 110 for tracking the subject region. However, the image capturing apparatus 1 may be provided with no subject detecting unit 109. In this case, the reference image registering unit 111 initially registers as a reference image, for example, a region specified by an external device communicably connected via a communication interface. Alternatively, a predetermined region in an image to be utilized for the focus control mechanism or the exposure control mechanism (such as an AF frame of a photometric frame) may be registered as an initial reference image.

Figure 2:
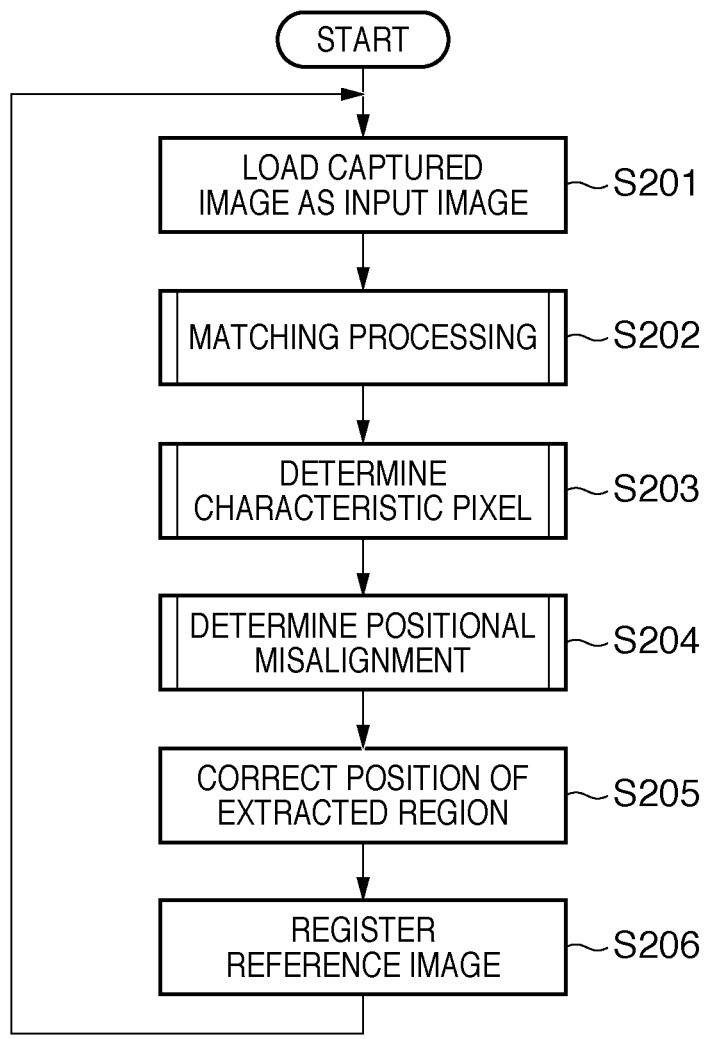
FIG. 2 is a flowchart showing processing for subject tracking according to the first embodiment.
Figure 3:
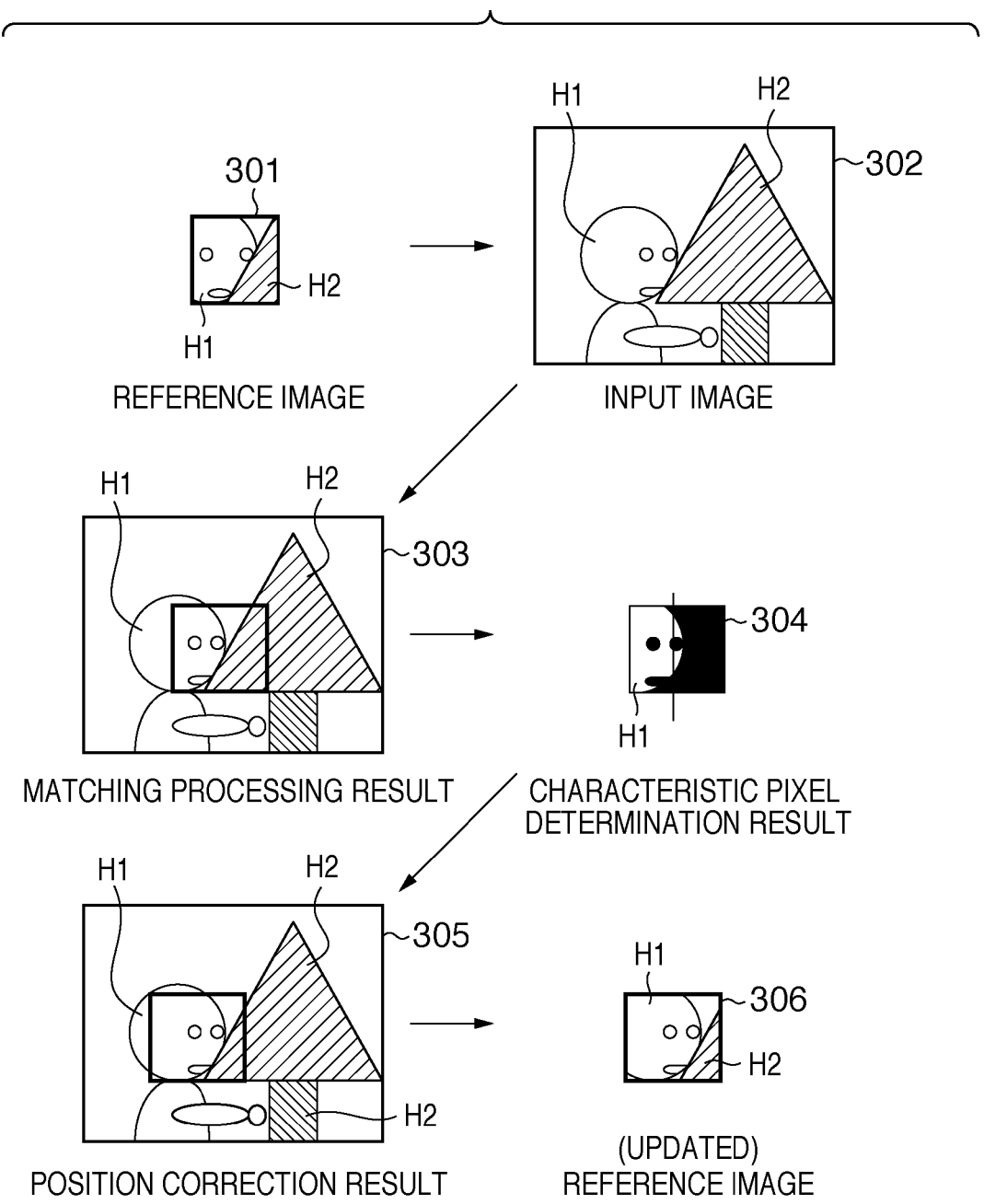
FIG. 3 is a diagram for illustrating the subject tracking according to the first embodiment.

Now, processing according to the first embodiment, which is processing carried out by the subject tracking unit 110, will be described with reference to FIGS. 2 and 3. FIG. 2 is a flowchart showing processing for subject tracking according to the first embodiment. FIG. 3 is a diagram for illustrating the subject tracking. It is to be noted that an example of tracking a person's face as a subject will be given in the following description.

As shown in FIG. 2, the subject tracking unit 110 carries out processes S201 to S206. The S202, S203, S204, S205, and S206 are a series of processes executed respectively by the matching processing unit 112, the characteristic pixel determination unit 113, the positional misalignment determination unit 114, the position correcting unit 115, and the reference image registering unit 111.

Furthermore, in FIG. 3, a reference image 301 refers to an image registered by the reference image registering unit 111. An input image 302 refers to an image input to the subject tracking unit 110. A subject extraction result 303 refers to a result of detecting a subject region by the matching processing unit 112 with the use of the input image 302 and the reference image 301. A determination result 304 refers to a result of determining a characteristic pixel by the characteristic pixel determination unit 113 from the subject extraction result 303. A correction result 305 refers to a result of correcting the position of the subject region in the subject extraction result 303 by the positional misalignment determination unit 114 from the determination result 304. A reference image 306 refers to an image registered by the reference image registering unit 111 in accordance with the correction result 305.

First, as shown in FIG. 2, in the subject tracking unit 110, captured images sequentially captured by the image sensor 102 are loaded as the input image 302 in S201. It is to be noted that the loading of the input image 302 in S201 may be carried out for each captured image sequentially captured, that is, for each frame, or may be carried out for each periodic frame.

Then, the matching processing unit 112 carries out matching processing for the input image 302 with respect to the reference image 301 registered in advance in the reference image registering unit 111.

Figure 10:
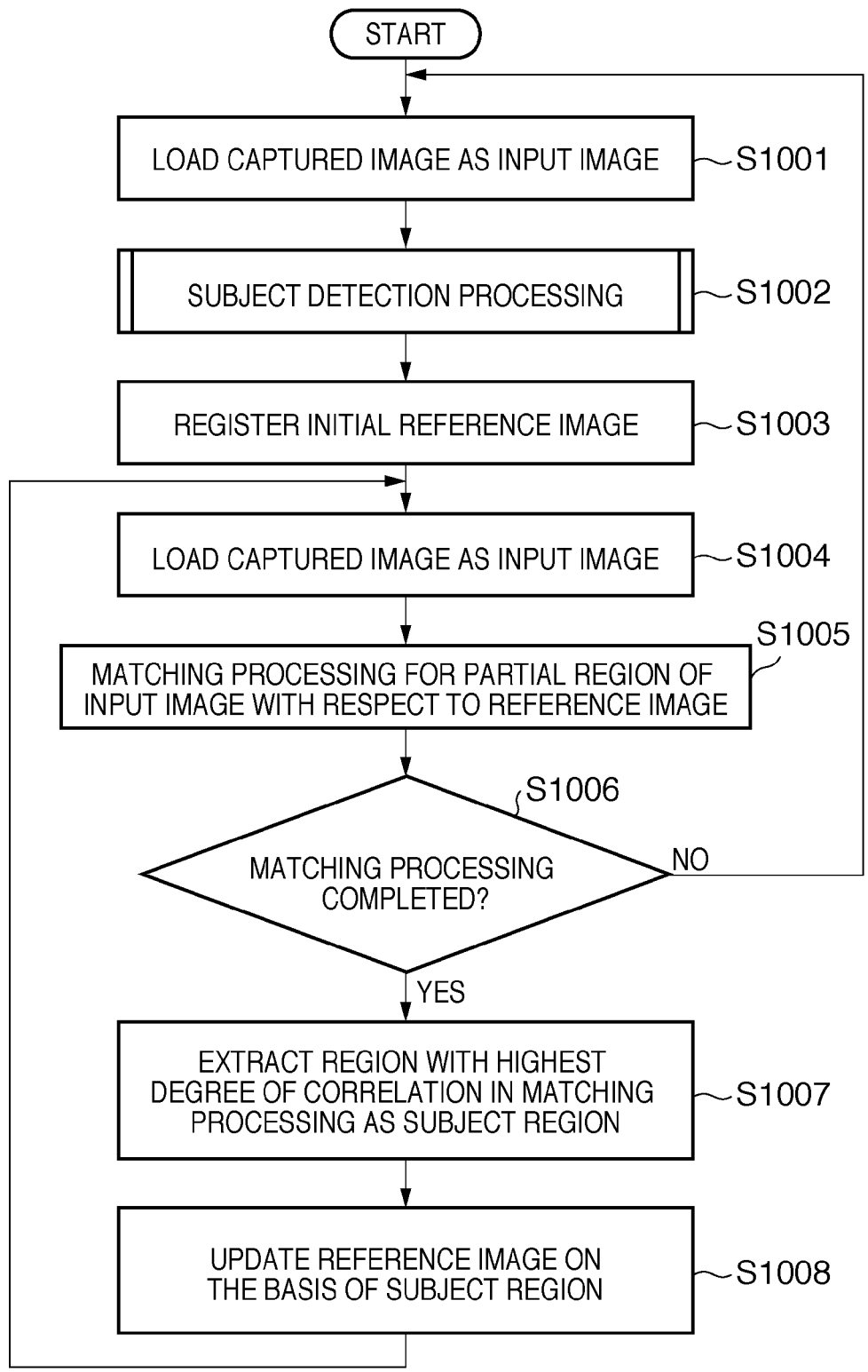
FIG. 10 is a flowchart of subject tracking through conventional template matching.
Figure 11:
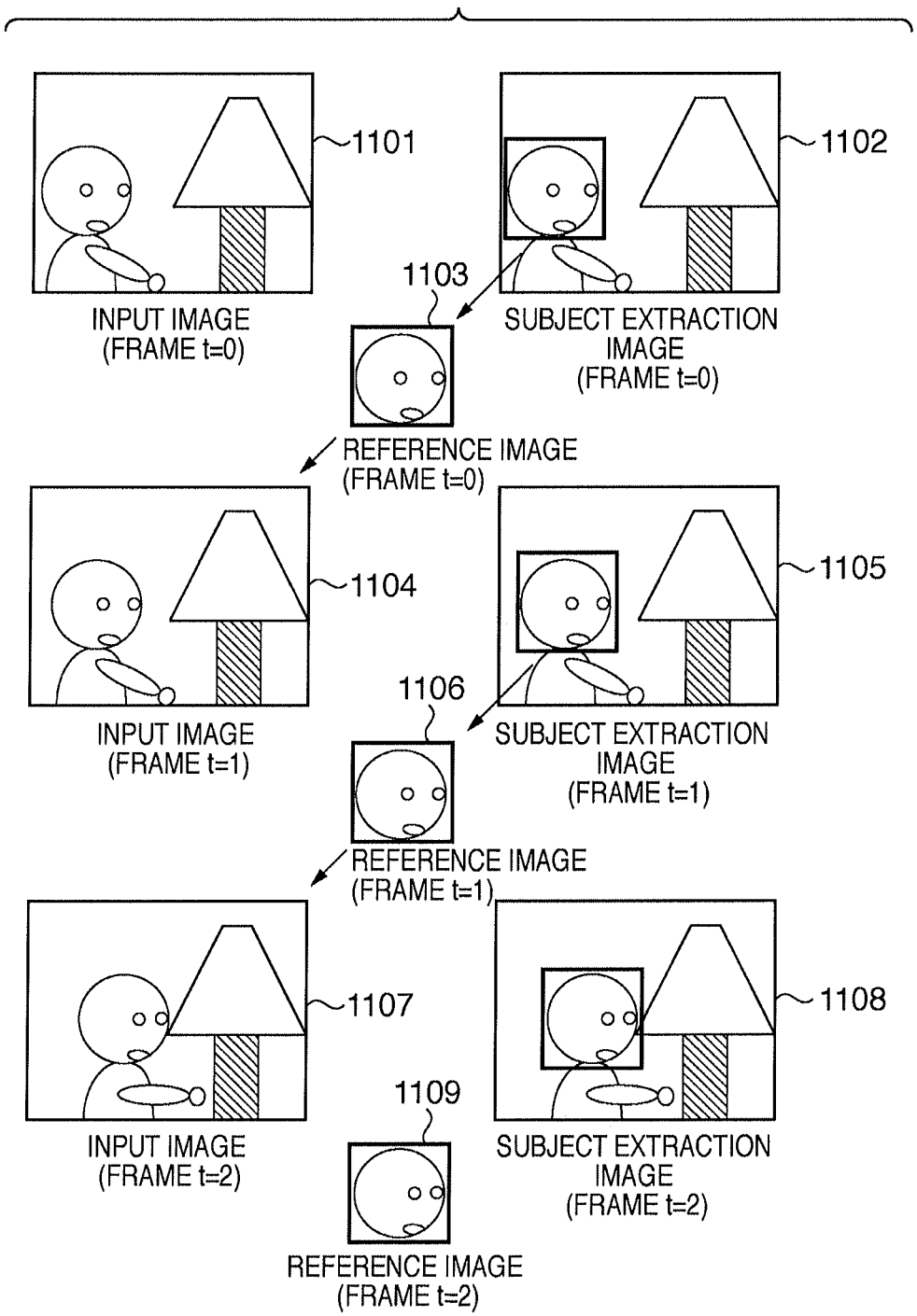
FIG. 11 is a diagram illustrating an example of the subject tracking through the conventional template matching.

In the matching processing, the sum of differences is calculated between each pixel of a partial region, which has the same size as the reference image 301, in the input image 302 and each pixel of the reference image 301. Then, the position of the partial region, which has the same size as the reference image 301, in the input image 302 is varied to carry out processing in which the position of the partial region at which the calculated sum of differences is at a minimum is taken as the region with the highest degree of correlation (similarity) (S1005 to S1007 in FIG. 10). It is to be noted that there is a variety of methods as the method for matching in connection with the two images, and the example of processing in the present invention is merely one example.

Since the matching processing is here based on the similarity between the reference image 301 and the input image 302, it is not necessarily the case that the proper subject region is the result of the matching processing. In the result of the matching processing shown in the subject extraction result 303, a region partially shifted from the proper subject region is extracted as a result. This is due to the reference image containing therein a background H2 which differs from a subject H1 to be contained in the subject region, as shown in the reference image 301, and further, due to the change in the appearance of the subject H1, e.g., the change in the orientation of the subject H1 from the front to the side, in the reference image 301 and the input image 302. Therefore, the high degree of correlation between the background H2 in the reference image 301 and the background H2 in the input image 302, and thus, the change in the appearance of the subject H1 result in the shifted result as in the subject extraction result 303, even though in a normal situation the subject H1 should be centered.

Figure 4:
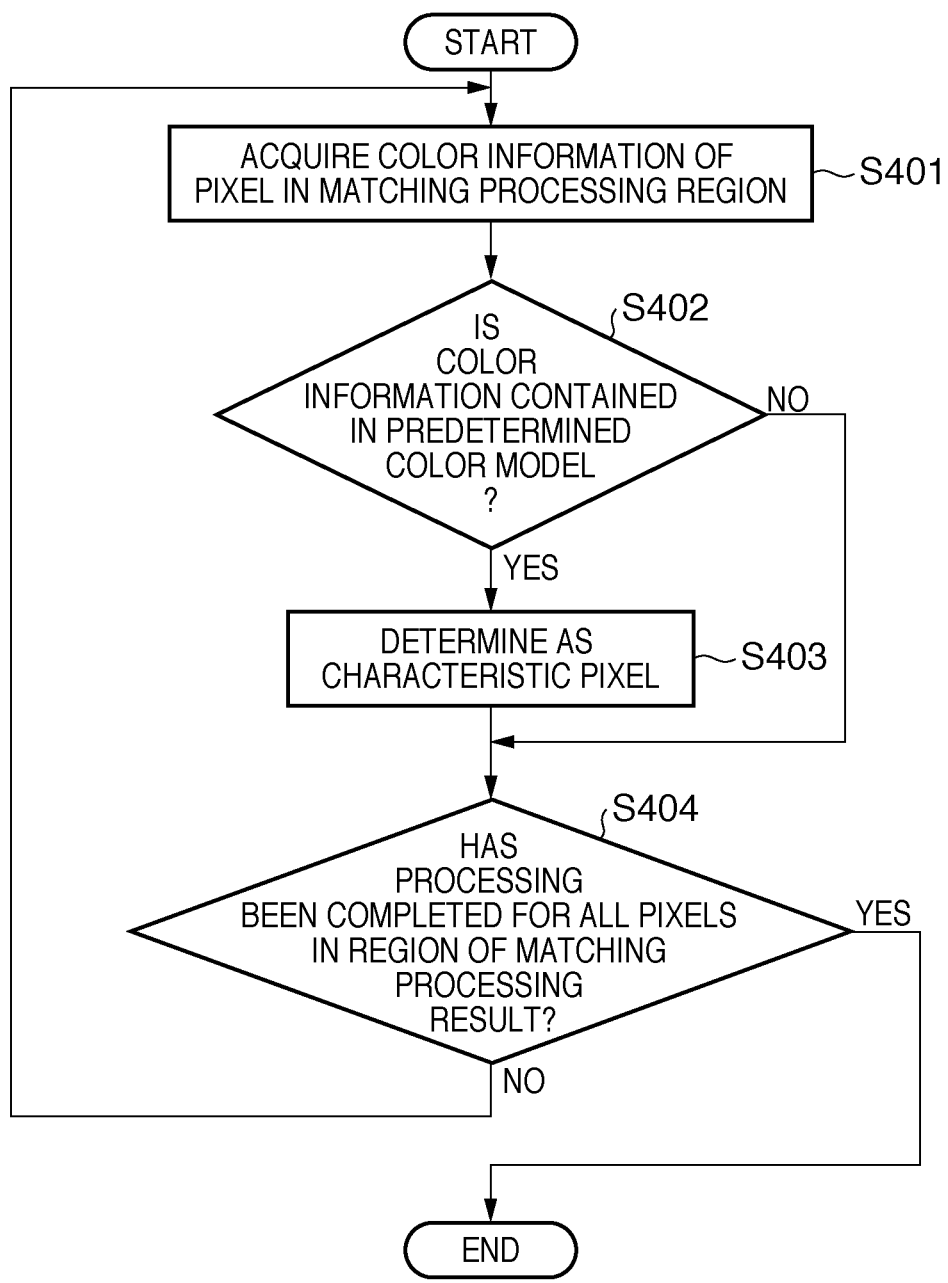
FIG. 4 is a flowchart showing processing for determining a characteristic pixel according to the first embodiment.

Then, the characteristic pixel determination unit 113 determines, for the subject region acquired in the matching processing, a characteristic pixel which represents a characteristic of the subject (S203). FIG. 4 is a flowchart of processing for determining a characteristic pixel.

As shown in FIG. 4, when the processing for determination is started, the characteristic pixel determination unit 113 acquires information on the color of a pixel in a predetermined position in the subject region obtained by the matching processing (S401). Then, the characteristic pixel determination unit 113 determines in S402 whether or not the acquired color information is information contained in a predetermined color model.

If the color information is information contained in the predetermined color model (S402: YES), the pixel is determined as a characteristic pixel (S403). It is to be noted that if the color information is not information contained in the predetermined color model (S402: NO), the pixel is not determined as a characteristic pixel.

Then, the characteristic pixel determination unit 113 determines whether or not the processing has been carried out for all of the pixels in the subject region obtained by the matching processing (S404). If the processing has not been carried out for all of the pixels (S404: NO), the characteristic pixel determination unit 113 returns the processing to S401 in order to acquire color information on the pixels for which the processing has not been carried out. Alternatively, if the processing has been carried out for all of the pixels (S404: YES), the characteristic pixel determination unit 113 ends the processing.

From the determination of the characteristic pixels described above, the determination result 304 is obtained. In the determination result 304, the characteristic pixels are white, whereas the pixels other than the characteristic pixels are blacked out. The predetermined color model here refers to a color model which represents a characteristic of the subject, and is provided as a flesh-colored model in a case in which the subject is a person's face. An example of this flesh-colored model is as shown in FIG. 5.

Figure 5:
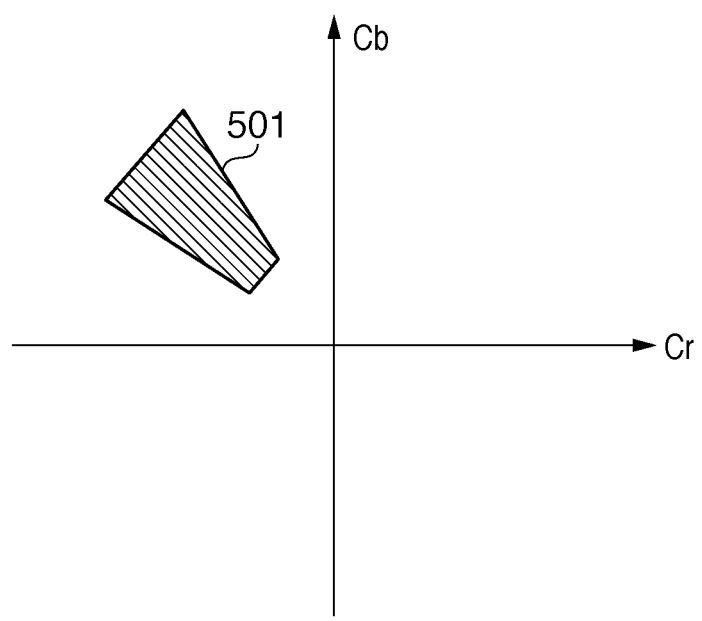
FIG. 5 is a diagram illustrating as an example of a color model according to the first embodiment.

It is to be noted that the color information acquired from a pixel is provided as a color difference CbCr in YcbCr data, and the horizontal axis and the vertical axis in FIG. 5 are respectively denoted by symbols Cb and Cr. As shown in FIG. 5, a color region 501 refers to a region which represents a flesh-colored model, and the characteristic pixel determination unit 113 determines whether or not an acquired CbCr component is contained in the color region 501. It is assumed that information regarding this color model as shown in FIG. 5 is provided in advance in a memory (not shown) in the characteristic pixel determination unit 113.

It is to be noted that a variety of formats is conceivable for the formats of the acquired color information and color model. The example in the present embodiment is one example of those formats, and is not limited to the format exemplified. For example, the format of the color information acquired may be RGB data, or hue (H) data converted into data in a HSV colorimetric system.

Furthermore, a variety of methods is conceivable as for the method for determining a characteristic pixel on the basis of the color model and the color information on pixels. The example in the present embodiment is one example of those methods, and is not limited to the determination method exemplified. Moreover, the region for which the determination of characteristic pixels is carried out may be the same region as the region detected from the result of the matching processing, or it may be a predetermined region with the barycenter of the extracted region as its center.

Figure 6:
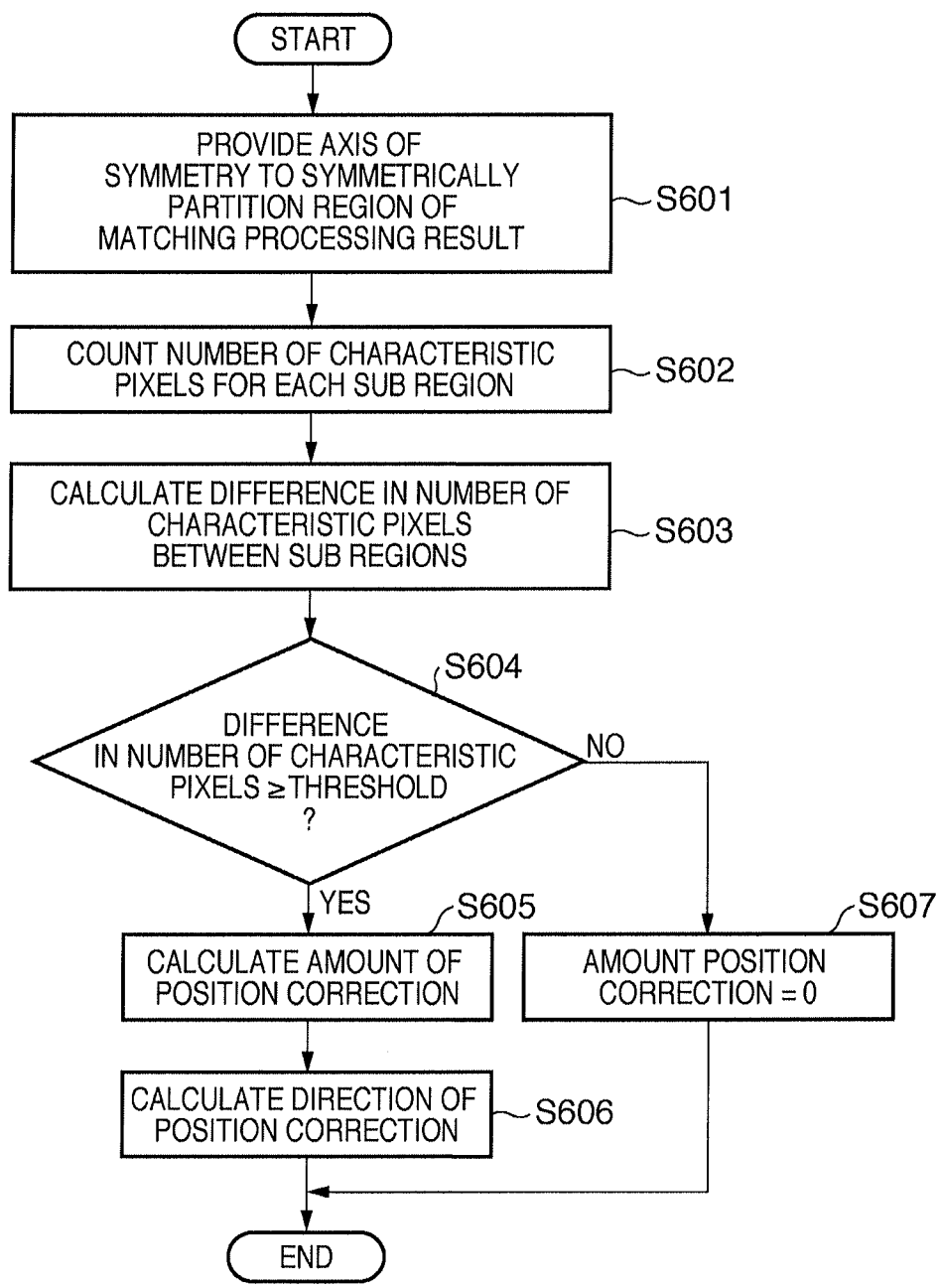
FIG. 6 is a flowchart showing determination of positional misalignment according to the first embodiment.

Then, as shown in FIG. 2, the positional misalignment determination unit 114 determines positional misalignment for the subject region in the result of the matching processing, on the basis of the result of determining the characteristic pixels (S204). FIG. 6 is a flowchart showing determination of positional misalignment.

As shown in FIG. 6, when the processing for determining positional misalignment is commenced, the positional misalignment determination unit 114 provides, in the subject region in the result of the matching processing, an axis of symmetry passing through the center of the region (S601). Then, the positional misalignment determination unit 114 counts the number of characteristic pixels from the result of determining characteristic pixels for each of the sub regions with the axis of symmetry as a border (S602). Then, the positional misalignment determination unit 114 calculates the difference in the number of characteristic pixels between the sub regions (S603).

Then, the positional misalignment determination unit 114 determines whether or not the difference in the number of characteristic pixels between the sub regions is equal to or greater than a predetermined threshold (first threshold) provided in advance in a memory or the like (S604). If the difference in the number of characteristic pixels is equal to or greater than the first threshold (S604: YES), the positional misalignment determination unit 114 calculates the amount of position correction corresponding to the difference in the number of characteristic pixels (S605). Specifically, the larger the difference in the number of characteristic pixels, the larger amount of position correction calculated. This allows the amount of position correction to be calculated depending on the degree of shift in a case in which the characteristic pixels are distributed unevenly and concentrated in one of the sub regions with the axis of symmetry. Furthermore, the amount of position correction may be normalized on the basis of the size of the subject region in the result of the matching processing (for example, the amount of position correction may be calculated as a ratio using 1 as the size of the subject region).

Subsequent to S605, the positional misalignment determination unit 114 calculates the direction of position correction (S606) and ends the processing. The direction of correction is perpendicular to the provided axis of symmetry, and determined as the direction toward the region with the larger number of characteristic pixels in the sub regions with the axis of symmetry as a border. It is to be noted that if the difference in the number of characteristic pixels is less than the threshold (S604: NO), the positional misalignment determination unit 114 provides a value of 0 as the amount of position correction (S607) and ends the processing.

Figure 7:
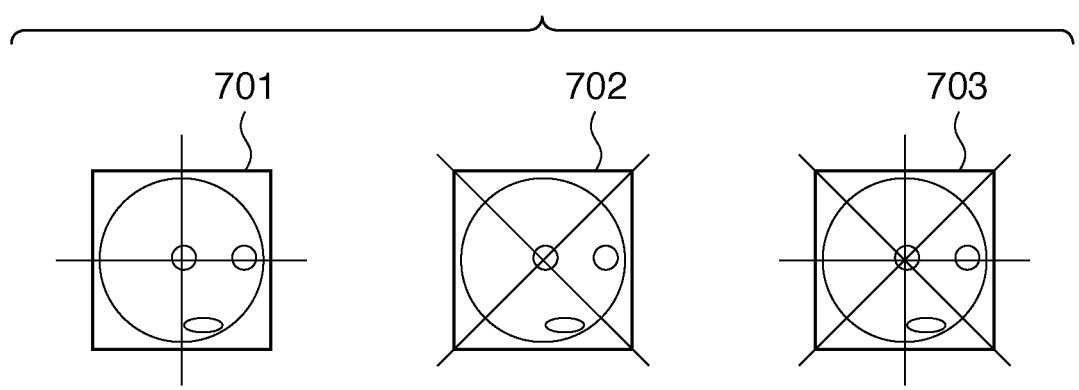
FIG. 7 is a diagram illustrating examples of providing axes of symmetry in the determination of positional misalignment according to the first embodiment.

In the determination of positional misalignment here, at least one axis of symmetry, that is, one or more axes of symmetry may be provided, and in a case in which multiple axes of symmetry are provided in directions different from each other, the amount and direction of position correction are calculated for each axis of symmetry (for each line). FIG. 7 is a diagram illustrating examples of providing multiple axes of symmetry. As shown in FIG. 7, axes of symmetry are provided in the vertical and horizontal directions for an image which represents the subject region in a provision example 701. As described above, positional misalignment in the vertical and horizontal directions can be determined by providing axes of symmetry in the vertical and horizontal directions and calculating the amount and direction of position correction for each direction. Furthermore, the position correction for the subject region can be carried out on the basis of the amount and direction of position correction calculated for each axis of symmetry (for each line).

It is to be noted that a variety of methods is conceivable for the method for providing the axis of symmetry, and any method may be employed as long as the axis symmetrically partitions the subject region for which the determination of positional misalignment is to be carried out. For example, axes of symmetry may be provided in oblique directions as in a provision example 702, or the provisions of the axes of symmetry in the provision example 701 and in the provision example 702 may be combined as in a provision example 703.

Then, as shown in FIG. 2, the position correcting unit 115 corrects the position of the subject region in the result of the matching processing in accordance with the amount and direction of position correction that is the result of the determination of positional misalignment (S205). Specifically, as shown in FIG. 3, with respect to the axis of symmetry in the vertical direction the determination result 304 for characteristic pixels has the smaller number of characteristic pixels in the right region and the larger number of characteristic pixels in the left region. Further, with respect to the axis of symmetry in the horizontal direction, the difference in the number of characteristic pixels between the upper region and the lower region is smaller. Therefore, as shown in the correction result 305, a region obtained by rightward shifting the subject region in the result of the matching processing is taken as the result of the position correction. In the image capturing apparatus 1, this result of the position correction is taken as the result of tracking the subject region by the processing for tracking the subject.

Then, the reference image registering unit 111 registers, as a new or updated reference image 306, the subject region tracked on the basis of the result of the position correction (S206). The reference image 306 registered by the reference image registering unit 111 is utilized for matching processing for the next frame. In the image capturing apparatus 1, subject tracking can be carried out appropriately by sequentially updating the reference image in accordance with the processing described above, even in a case in which the appearance of the subject changes in a time series manner, e.g., the orientation of the subject changes.

Furthermore, in a case in which the subject detecting unit 109 and the subject tracking unit 110 are both operated, the reference image registering unit 111 may register a reference image on the basis of the result with a higher degree of reliability by comparing degrees of reliability with each other. On the other hand, for example, in a case in which the time series change in the appearance of the subject is not considered, the initially registered reference image may be kept without updating the reference image.

In addition, a variety of shapes is conceivable for the shape of the reference image 306 registered by the reference image registering unit 111 in the processing described above. The example in the present embodiment is one example of those shapes, and is not limited to the rectangular shape exemplified. For example, the shape of the reference image 306 may be circular or polygonal.

Furthermore, the subject tracking unit 110 may stop subject tracking if the number of characteristic pixels obtained by the characteristic pixel determination unit 113 is less than a predetermined threshold (second threshold) provided in advance. For example, in a case in which a subject as the target to be tracked by the subject tracking unit 110 is hidden behind an obstacle, the number of characteristic pixels in the subject region in the result of the matching processing is reduced, and the subject tracking is stopped when the number falls below the second threshold. This can reduce the possibility of tracking a background contained in the subject region.

As described above, in the processing for subject tracking in the first embodiment, even in a case in which a subject region is extracted which contains a background which differs from a subject to be tracked by the matching processing, the position of the extracted subject region is corrected depending on characteristic pixels representing the subject. This allows a subject region properly tracking the subject to be extracted. More specifically, the accuracy of the processing for subject tracking can be improved, thereby reducing the possibility of wrongly tracking a background or the like contained in the subject region.

Second Embodiment

Figure 8:
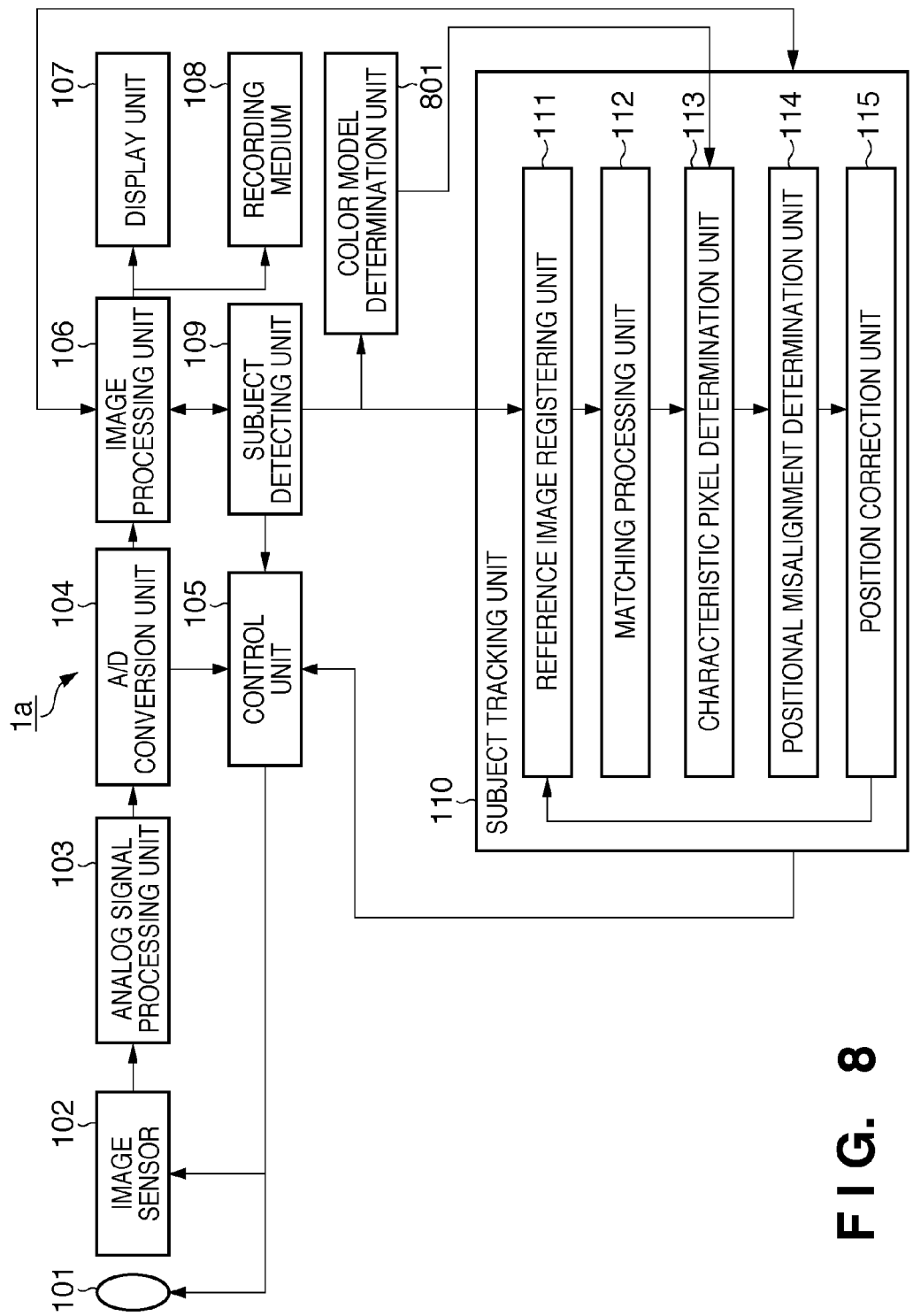
FIG. 8 is a block diagram illustrating the configuration of an image capturing apparatus according to a second embodiment.

Next, the configuration and operation of an image capturing apparatus according to a second embodiment will be described with reference to the drawings, while focusing on the differences from the first embodiment. It is to be noted that the same configuration and operation as those of the first embodiment are denoted by the same reference symbols, and descriptions thereof will be thus omitted. FIG. 8 is a block diagram illustrating the configuration of an image capturing apparatus 1a according to the second embodiment.

As shown in FIG. 8, the difference between the image capturing apparatus 1a and the image capturing apparatus 1 is that the image capturing apparatus 1a includes a color model determination unit 801. The color model determination unit 801 determines a color model with the use of color information in a subject region extracted from an image on the basis of the result obtained by the subject detecting unit 109. The color model determined in the color model determination unit 801 is utilized in the characteristic pixel determination unit 113 of the subject tracking unit 110.

As the method for the determination of the color model, which is carried out by the color model determination unit 801, a method can be cited of generating a color histogram and approximating the generated color histogram with the use of a mixed normal distribution model. Since the method for the determination of the color model is not a main object in the present embodiment, a detailed description of the method for the determination of the color model will be omitted.

It is to be noted that although the image capturing apparatus 1a in the present embodiment is one that includes the subject detecting unit 109, the image capturing apparatus 1a may be provided with no subject detecting unit 109. In this case, the reference image initially registered by the reference image registering unit 111 and the region used by the color model determination unit 801 for the determination of the color model will comply with the specification of a connected external device. Alternatively, the registration of the reference image and the determination of the color model may be carried out on the basis of a predetermined region in an image to be utilized for the focus control mechanism or the exposure control mechanism (such as an AF frame of a photometric frame).

Figure 9:
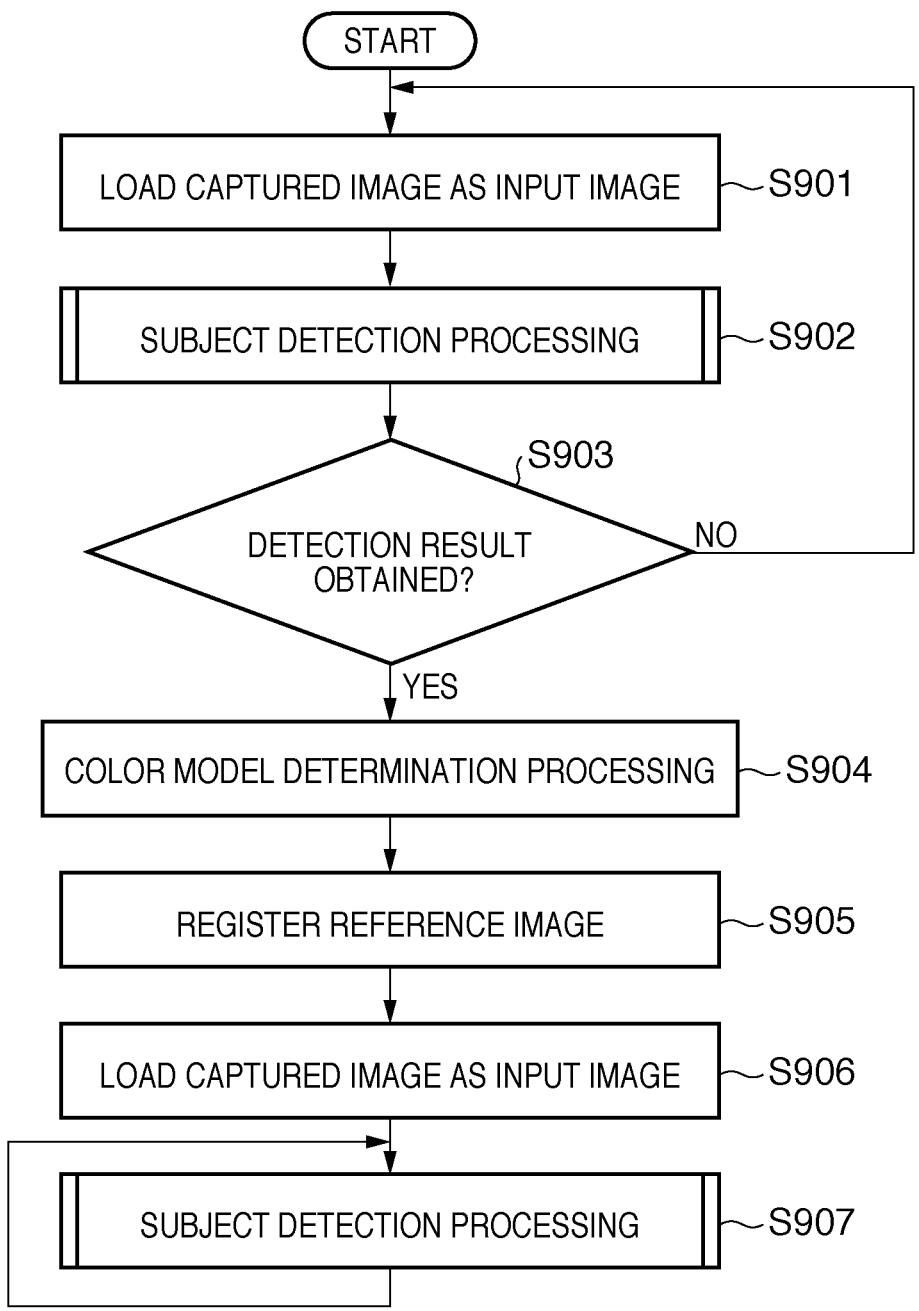
FIG. 9 is a flowchart showing processing for subject tracking according to the second embodiment.

Now, processing according to the second embodiment, which is processing carried out by the subject detecting unit 109, the subject tracking unit 110, and the color model determination unit 801, will be described with reference to FIG. 9. FIG. 9 is a flowchart showing processing for subject tracking according to the second embodiment.

As shown in FIG. 9, when the processing is started, the subject tracking unit 110 loads, as the input image, captured images sequentially captured by the image sensor 102 (S901). Then, in the subject detecting unit 109, subject detection processing is carried out with the use of the input image (S902). It is to be noted that in S902 the subject detected by the subject detecting unit 109 is a person's face.

Then, the subject tracking unit 110 determines whether or not the extraction result for a subject region is obtained by the subject detection processing (S903). For example, in a case in which the input image contains no person's face and thus no subject region can be detected, it will be determined that no extraction result could be obtained. Alternatively, in a case in which the input image contains a person's face and thus a subject region corresponding to the face can be detected, it will be determined that an extraction result could be obtained.

If the extraction result for a subject region is not obtained by the subject detection processing (S903: NO), the processing will be returned to S901. Alternatively, if the extraction result for a subject region is obtained by the subject detection processing (S903: YES), the color model determination unit 801 determines a color model with the use of color information on the extracted subject region (S904). Furthermore, the reference image registering unit 111 registers the extracted subject region as a reference image (S905).

Then, the subject tracking unit 110 loads a captured image in the next frame as the input image (S906), and carries out processing for subject tracking with the use of the loaded input image (S907). It is to be noted that the processing for subject tracking in S907 involves the same processing as S202 to S206 described in the first embodiment.

In the second embodiment described above, the color model for the characteristic pixel determination unit 113 in the subject tracking unit 110 is determined dynamically from the subject region detected by the subject detecting unit 109, thereby allowing a wide variety of subjects to be handled. Specifically, since the color model is determined dynamically for each particular subject, a color model is obtained that separates the particular subject and a background or the like which differs from the subject. Then, processing for subject tracking is carried out with the use of the obtained color model, thereby allowing processing for subject tracking with a higher degree of accuracy to be achieved.

It is to be noted that while cases of detecting a person's face as a subject have been described in the embodiments described above, the detected subject is not limited to a person's face, and alternatively animals, cars, etc., may be detected. Furthermore, while cases have been described in the embodiment described above in which the subject tracking apparatus for carrying out processing for subject tracking is applied to an image capturing apparatus, apparatuses to which the subject tracking apparatus is to be applied are not limited to image capturing apparatuses.

For example, the subject tracking apparatus for carrying out processing for subject tracking may be applied to a display apparatus for displaying images (replay data) supplied sequentially from an external device, a recording medium, or the like. In this display apparatus, processing for subject tracking will be carried out with the replay data as data for subject detection processing. A control unit such as a microcontroller in this display apparatus controls display conditions used when images are displayed, on the basis of information (the position, size, etc. of a subject in an image) on a subject tracked by the processing for subject tracking. Specifically, information representing a subject, such as a frame, is displayed superimposed on the position of the subject in the image, or control of the luminance, color shade, etc. for displayed images is exercised depending on the luminance or color information of the subject portion.

It is to be noted that the descriptions in the embodiments described above are intended to show examples only, and are not intended to limit the present invention. The configurations and operations in the embodiments described above can be modified appropriately.

For example, the position correcting unit 115 may correct not only the position of the subject region, but also the size and shape of the subject region. In a case in which the size of the subject region is to be corrected, for example, the size is increased depending on the amount of position correction, while the position of the side which lies in a direction opposite to the direction of position correction is fixed. Furthermore, in a case in which the shape of the subject region is to be corrected, for example, the side in the direction of position correction is shifted in the direction of position correction in accordance with the amount of position correction. This can reduce the shift in position of a predetermined subject, even one in which the size or shape of the subject region is to be corrected.

Moreover, for example, the positional misalignment determination unit 114 may be configured to calculate only the direction of position correction for reducing the difference in the number of characteristic pixels between the partitioned regions. In this case, the position correcting unit 115 sequentially moves the subject region in predetermined units in the direction of position correction so that that subject region may be selected which has the minimum difference in the number of characteristic pixels between the partitioned regions. Alternatively, for example, the positional misalignment determination unit 114 may be configured to calculate none of the direction and amount of position correction. In this case, the position correcting unit 115 sequentially moves the subject region within a predetermined range with the position of the subject region in the result of matching processing as a center, so that that subject region may be selected which has the minimum difference in the number of characteristic pixels between the partitioned regions.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-335229, filed on Dec. 26, 2008, which is hereby incorporated by reference herein its entirety.

What is claimed is:

1. A subject tracking apparatus for tracking a subject in images supplied in a time series manner, the subject tracking apparatus comprising:
   a reference image registering unit configured to register a reference image for use in tracking the subject;
   an extraction unit configured to extract, from a supplied image, a subject region which is similar to the reference image on the basis of a degree of correlation between the supplied image and the registered reference image;
   a position detection unit configured to detect the position of the subject in the subject region on the basis of a distribution of characteristic pixels representing the subject contained in the subject region; and
   a correction unit configured to correct the subject region so as to reduce a shift in the position of the subject in the subject region,
   wherein the corrected subject region is taken as a result of tracking the subject in the supplied image, and the reference image registering unit registers the corrected subject region as a reference image to be used for tracking the subject in a next supplied image.

2. The subject tracking apparatus according to claim 1, further comprising a subject detecting unit configured to detect a region corresponding to the subject from the supplied image,
   wherein the reference image registering unit registers, as the reference image, a region corresponding to the subject detected by the subject detecting unit.

3. The subject tracking apparatus according to claim 2, wherein the reference image registering unit compares a first accuracy representing an accuracy of detecting the subject in the region corresponding to the subject detected by the subject detecting unit with a second accuracy representing an accuracy of detecting the subject in the corrected subject region, and registers, as the reference image to be used for the next supplied image, the region corresponding to the subject detected by the subject detecting unit in a case in which the first accuracy is higher than the second accuracy, and the corrected subject region in a case in which second accuracy is higher than the first accuracy.

4. The subject tracking apparatus according to claim 2, further comprising a color model determination unit configured to determine a color model representing the subject on the basis of the color information of a pixel contained in the region corresponding to the subject detected by the subject detecting unit,
   wherein the position detecting unit uses as characteristic pixels those pixels which have color information contained in the determined color model from among pixels contained in the region corresponding to the subject detected by the subject detecting unit.

5. The subject tracking apparatus according to claim 1, wherein the position detecting unit uses as the characteristic pixels those pixels which have color information contained in a color model provided in advance for representing the subject, from among pixels contained in the region corresponding to the subject detected by the subject detecting unit.

6. The subject tracking apparatus according to claim 5, wherein the subject is a person's face, and
   the color model is a flesh-colored model representing a color of the person's skin.

7. The subject tracking apparatus according to claim 1, wherein the position detecting unit detects a difference in the number of the characteristic pixels contained in two sub regions obtained by bisecting the subject region with a straight line, and
   the correction unit carries out the correction in a case in which the difference is equal to or greater than a predetermined threshold.

8. The subject tracking apparatus according to claim 7, wherein the correction unit corrects the position of the subject region in a direction perpendicular to the straight line and toward the sub region with the larger number of the characteristic pixels from the straight line, and by an amount corresponding to the magnitude of the difference.

9. The subject tracking apparatus according to claim 8, wherein the position detecting unit provides a plurality of the straight lines in different directions from each other, and detects a difference in the number of characteristic pixels contained in the sub region for each of the plurality of the straight lines, and
   the correction unit corrects the position of the subject region for each of the straight lines.

10. An image capturing apparatus comprising:
    an image capturing unit configured to supplying sequentially captured images in a time series manner;
    the subject tracking apparatus according to claim 1 for tracking a subject in the images; and
    a control unit configured to controlling an image capturing condition used when the image capturing unit captures images, depending on information on pixels contained in a corrected subject region as a tracking result from the subject tracking apparatus.

11. A display apparatus comprising:
    a display unit configured to displaying images supplied in a time series manner;
    the subject tracking apparatus according to claim 1 for tracking a subject in the images; and
    a control unit configured to controlling a display condition used when the display unit displays the images, depending on information on pixels contained in a corrected subject region as a tracking result from the subject tracking apparatus.

12. A control method for a subject tracking apparatus for tracking a subject in images supplied in a time series manner, comprising:
    a reference image registering step for registering a reference image to be used for tracking the subject;
    an extraction step for extracting, from a supplied image, a subject region which is similar to the reference image, on the basis of a degree of correlation between the supplied image and the registered reference image;
    a position detection step for detecting the position of the subject in the subject region on the basis of distribution of characteristic pixels representing the subject contained in the subject region; and
    a correction step for correcting the subject region so as to reduce a shift in the position of the subject in the subject region,
    wherein the corrected subject region is taken as a result of tracking the subject in the supplied image, and the reference image registering step registers the corrected subject region as a reference image to be used for tracking the subject in a next supplied image.

13. A non-transitory computer-readable recording medium on which a program is recorded for causing a computer to execute each step of the control method for the subject tracking apparatus according to claim 12.

* * * * *